(12) United States Patent
Chatterjee et al.

(10) Patent No.: US 8,475,610 B2
(45) Date of Patent: Jul. 2, 2013

(54) INDUCTION HARDENING SYSTEM AND METHOD

(75) Inventors: Madhu Sudan Chatterjee, Saginaw, MI (US); William Irwin Stuehr, North Royalton, OH (US)

(73) Assignee: GM Global Technology Operations LLC, Detroit, MI (US)

( * ) Notice: Subject to any disclaimer, the term of this patent is extended or adjusted under 35 U.S.C. 154(b) by 354 days.

(21) Appl. No.: 12/898,432

(22) Filed: Oct. 5, 2010

(65) Prior Publication Data

US 2011/0247732 A1  Oct. 13, 2011

Related U.S. Application Data

(60) Provisional application No. 61/322,771, filed on Apr. 9, 2010.

(51) Int. Cl.
| | |
|---|---|
| *C21D 9/22* | (2006.01) |
| *C21D 9/24* | (2006.01) |
| *H05B 6/02* | (2006.01) |
| *H05B 6/10* | (2006.01) |
| *H05B 6/36* | (2006.01) |

(52) U.S. Cl.
USPC ........... 148/573; 148/567; 219/600; 219/640; 219/672

(58) Field of Classification Search
USPC .................. 148/567, 573; 219/600, 640, 672
See application file for complete search history.

(56) References Cited

U.S. PATENT DOCUMENTS

| 4,639,279 | A | 1/1987 | Chatterjee | |
|---|---|---|---|---|
| 6,576,877 | B2 * | 6/2003 | Dabelstein et al. | 219/640 |
| 2009/0020525 | A1 * | 1/2009 | Loveless et al. | 219/640 |

* cited by examiner

*Primary Examiner* — Keith Walker
*Assistant Examiner* — Alexander Polyansky

(57) ABSTRACT

A system and method of induction heat treating a gear includes a workstation. The workstation has a power source, an inductor coil, and a rotational mechanism. The gear is induction heat treated at a first portion of the gear and a second portion of the gear remains untreated by induction hardening. The gear has an inner surface. The inner surface includes the first portion and the second portion. The first portion has a first width. The second portion has a second width. The inductor coil includes at least one heating loop and at least one non-heating loop. The inductor coil is energized to a predetermined frequency to create an alternating magnetic field, where the alternating magnetic field developed in the heating loop induces an eddy current in the first portion of the gear.

11 Claims, 3 Drawing Sheets

INDUCTION HARDENING SYSTEM AND METHOD

CROSS-REFERENCE TO RELATED APPLICATIONS

This application claims the benefit of U.S. Provisional Application No. 61/322,771, filed on Apr. 9, 2010. The disclosure of the above application is incorporated herein by reference.

FIELD

The present invention relates to a system and method of hardening a gear or gear like object, and more particularly to a system and method of selectively hardening a portion of an inner surface of the gear using induction heat treatment.

BACKGROUND

The statements in this section merely provide background information related to the present disclosure and may or may not constitute prior art.

Gears can be hardened by an induction heat treatment to improve wear resistance. In one type of gear, the inner surface of the gear includes a plurality of splines. The splines do not cover the entire circumference of the inner surface. Instead, the inner surface includes several webs, where a series of splines are located between each web. The webs are an area of decreased wall thickness along the inner surface of the gear. It is typically desirable to heat treat only the splines, as the webs have a reduced wall thickness that is susceptible to melting or cracking.

In one approach, induction heat treatment is used to only harden the splines. However, it is not possible to only heat treat the splines with the current induction coil and process design technology. A non-rotational induction heat treatment technique is employed, where the gear is oriented in a particular position and all of the splines are concurrently heated by a coil placed within the inner surface of the gear. However, this non-rotational approach results in a non-uniform and unsymmetrical heat treat pattern, and also tends to overheat the webs, which leads to melting and cracking of the webs. As a result, several splines between each web will remain untreated in an effort to avoid overheating the web. This results in gears that do not meet heat treatment specifications. The current approach of orienting the spline with respect to the inductor coil requires special handling issues and adds to the cost of the product. Moreover, the current induction hardening process also produces very deep hardening, or case, along the outer surface of the gear. Thus, the current approach of induction hardening can produce that have built in stresses, which may lead to premature mechanical failure of the gears. As a result, there is a need in the art for a robust induction hardening process for a gear that heats the splines uniformly without overheating the webs.

SUMMARY

The present invention provides a method and system for hardening a gear employing a rotatable type induction hardening technique. A first portion of the gear is induction heat treated and a second portion of the gear remains untreated. The gear has an inner surface. The inner surface includes the first portion and the second portion. The first portion has a first width and the second portion has a second width.

The method includes a first step where the gear is placed within a workstation. The workstation has a power source and an inductor coil. The power source provides alternating current to the inductor coil. The inner surface of the gear is positioned to be proximate to the inductor coil. The inductor coil includes at least one heating loop and at least one non-heating loop. The heating loop has a heating loop width and the non-heating loop has a non-heating loop width. The non-heating loop width is configured to be about equal to the second width of the gear. The heating loop width is configured be about equal to the first width of the gear. In a second step, the gear is rotated about an axis of rotation relative to the inductor coil. In a third step, the inductor coil is energized to a predetermined frequency to create an alternating magnetic field. The magnetic field developed in the heating loop induces an eddy current in the first portion of the gear. In a fourth step, the inductor coil is maintained at the predetermined frequency for a predetermined amount of time to induction harden the gear at the first portion.

In another embodiment of the invention, the method comprises the step of providing a plurality of spline groups as the first portion of the gear and a plurality of webs as the second portion of the gear.

In an embodiment of the invention, the method comprises the step of quenching the gear by fluid. Fluid is supplied to the gear by a quenching plate having a series of fluid passageways.

In another embodiment of the invention, the method comprises the step of providing a flux intensifier that is included within the quenching plate.

In yet another embodiment of the invention, the method comprises the step of positioning the inductor coil in place within the workstation by the quenching plate. A portion of the inductor coil is located within the quenching plate.

In an embodiment of the invention, the method comprises the step of rotating the gear about the axis at a rotary speed of about 1000 RPM.

In another embodiment of the invention, the method comprises the step of orienting the eddy current to extend lengthwise along the first portion of the gear.

In yet another embodiment of the invention, the method comprises the step of orienting the eddy current to extend circumferentially around the inner surface of the gear.

In an embodiment of the invention, the method comprises the step providing a portion of the non-heating loop that is parallel with the axis of rotation of the gear.

In another embodiment of the invention, the method comprises the step of creating a net alternating magnetic field that is about zero in the portion of the non-heating loop that is parallel with the axis of rotation.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1A:
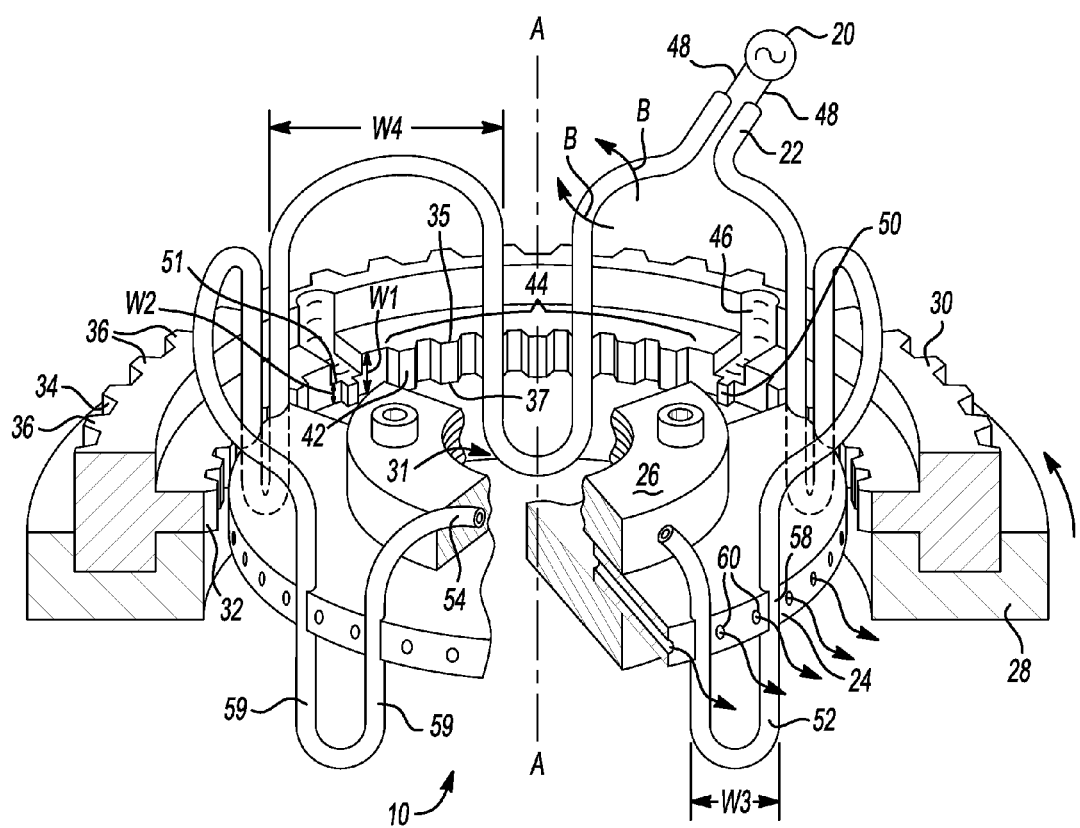
FIG. 1A is an exemplary illustration of a gear placed in a work station for carrying out an induction heat treatment.

Referring now to FIG. 1A, the reference numeral 10 designates an exemplary rotatable induction hardening work station having a power source 20, an inductor coil 22, a quenching plate 24, a support member 26 and a rotational mechanism 28. The support member 26 and the quenching plate 24 have been partially sectioned at a ninety degree angle to show detail of a gear 30 that is hardened in the workstation 10. The work station 10 is used to harden the gear 30 rotatably supported by a spindle or rotation mechanism (not shown). In the embodiment as shown, the support member 26 is a phenolic block support having a threaded aperture 31 and hose stem. The inductor coil 22 and the quenching plate 24 are held stationary and surrounded by the gear 30, which has an inner surface 32. The gear 30 is secured to the rotational mechanism 28. The rotational mechanism 28 is any type device capable of rotating the gear 30 about an axis A-A such as, for example, a spindle. The gear 30 can be any type of rotating component used to mesh with another part in order to transmit torque. In one exemplary embodiment, the gear 30 is either a drive or driven sprocket of a transmission. In the embodiment as shown, the work station 10 is used to harden the inner surface 32 of the gear 30. An outer surface 34 of the gear 30 includes a plurality of teeth 36 that are hardened using a separate operation. In one example, the teeth 36 are hardened using a single shot induction hardening process that is disclosed in U.S. Pat. No. 4,639,279, which is hereby incorporated by reference herein.

Figure 2:
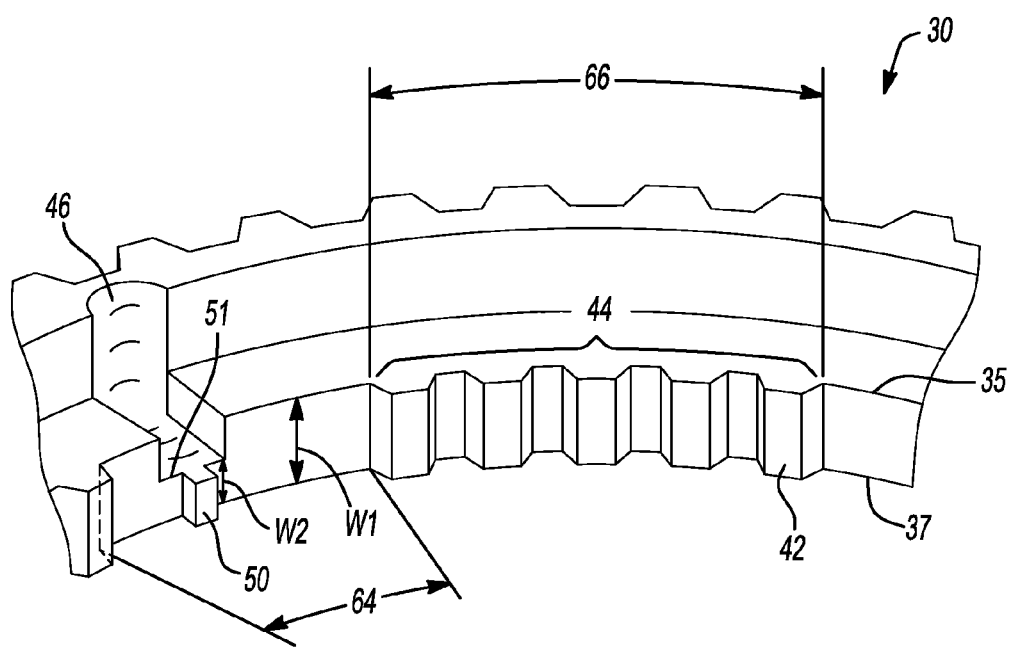
FIG. 2 is an enlarged view of the gear illustrated in FIG. 1A.

The inner surface 32 of the gear 30 includes a plurality of splines 42 that cover a portion of the circumference of the inner surface 32. The splines 42 are arranged in a series of spline groups 44, where a web 46 is included between the spline groups 44. The webs 46 represent an area of reduced wall thickness along the inner surface 32 of the gear 30. Specifically, the spline groups 44 have a first wall thickness W1 and the webs 46 have a second wall thickness W2, where the first wall thickness W1 is greater than the second wall thickness W2. Referring to both FIGS. 1A and 2, the first wall thickness W1 is measured axially along the inner surface 32 of gear 30, and represents the height of the spline groups 44. Specifically, the first wall thickness W1 represents the distance between a top edge 35 and a bottom edge 37 of the inner surface 32. The second wall thickness W2 is also measured axially along inner surface 32 of gear 30 and represents the distance between an edge 51 of the web 46 and the bottom edge 37 of the inner surface 32. The edge 51 of the web 46 represents a portion of an outermost boundary of the web 46 located nearest to the axis of rotation A-A of the gear 30. A spline 50 can also be located below the web 46. The webs 46 represent an area of reduced wall thickness and strength along the inner surface 32. Because of this, only the splines 42 are heat treated, as the webs 46 have a reduced wall thickness are therefore susceptible to melting or cracking during heat treatment.

Figure 1B:
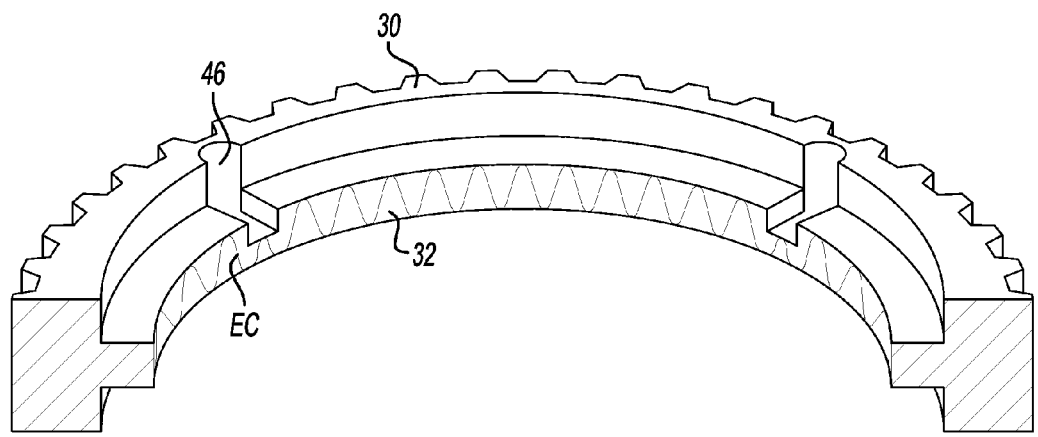
FIG. 1B is a partial cross-sectional view of the gear of FIG. 1A showing the propagation of an eddy current (EC) waveform through the inner surface of the gear.
Figure 1C:
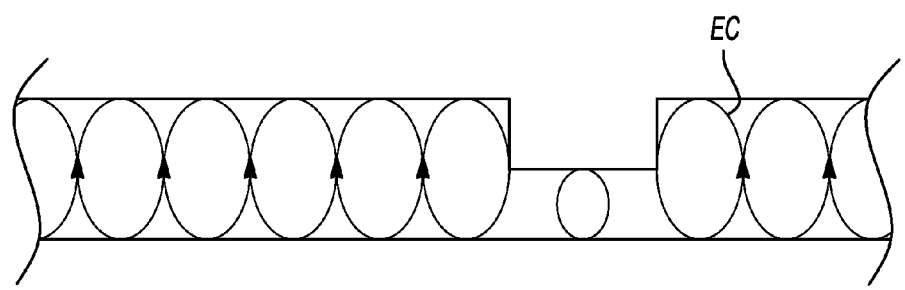
FIG. 1C is an alternative embodiment illustrating the eddy current.

Referring to FIG. 1A, the inductor coil 22 is connected to the power supply 20 through a pair of inductor leads 48. The power supply 20 provides alternating current to the inductor coil 22. The inductor coil 22 is energized by the power supply 20 to a predetermined frequency and power level for a predetermined amount of time to achieve a desired level of heating. The frequency, power level, and time are interrelated and depend on the particular application and configuration of the gear 30. Specifically, the inductor coil 22 produces an alternating magnetic field B that generates eddy currents within the gear 30 for induction hardening. FIG. 1B illustrates a partial cross section of the gear 30 with the splines 42 removed to illustrate the eddy currents EC extending lengthwise along the inner surface 32 of the gear 30. The eddy currents EC uniformly heat the splines 42. Alternatively, the eddy currents EC can also extend circumferentially around the inner surface 32 of the gear 30 as well (as shown in FIG. 1C and labeled EC). The inductor coil 22 is energized at the predetermined frequency for the predetermined amount of time to achieve a desired induction heat treatment depth of the inner surface 32 of the gear 30.

Turning back to FIG. 1A, in the embodiment as shown the inductor coil 22 is shaped in a predetermined configuration that depends on the inner surface 32 of the gear 30. The inductor coil 22 is shaped to include at least one non-heating loop 52 and at least one heating loop 54, where the non-heating loop 52 has a width W3 and the heating loop 54 has a width W4. The widths W3 and W4 of the non-heating loop 52 and the heating loop 54 can be adjusted to correspond to a particular gear 30 depending on the configuration of the gear 30. Specifically, the width W3 of the non-heating loop 52 is configured to be about equal to the width 64 of the non-splined portion measured around the inner surface 32 of the gear 30 (shown in FIG. 2). The width W4 of the heating loop 54 is configured be about equal to the width 66 of the splined portion 44 measured around the inner surface 32 of the gear 30 (also shown in FIG. 2). The widths W3 and W4 of the non-heating and heating loops 52 and 54 can be adjusted to match the dimensions of the splined and non-splined portions of the inner surface 32.

The configuration of the non-heating and heating loops 52 and 54 create the eddy current EC only in the splines 42 and 50 located along the inner surface 32 of the gear 30, while at the same time creating a negligible amount of eddy current EC in the webs 46. The orientation of the heating loop 54 creates the eddy current EC in the splines 42 and 50. The orientation of the non-heating loop 52 causes the eddy current EC to be cancelled in the regions along the inner surface 32 that are not splined. Specifically, each non-heating loop 52 includes two generally opposing parallel portions 59 that are positioned parallel to the axis of rotation A-A. The alternating magnetic field B traveling through one of the parallel portions 59 of one of the non-heating loops 52 is in a direction that generally opposes the alternating magnetic field B traveling through the other one of the parallel portions 59 of the selected non-heating loop 52. The parallel portions 59 of each non-heating loop 52 are oriented in proximity to one other such that the alternating magnetic field B traveling through one of the parallel portions 59 of the non-heating loop 52 cancels the alternating magnetic field B traveling through the other parallel portion 59 of the non-heating loop 52, resulting in a net alternating current that is negligible or zero. This configuration of the non-heating loop 52 creates dead spots with a minimal amount or no eddy current EC in the gear 30 where the webs 46 are situated. The webs 46 also represent a portion of the gear 30 with reduced mass and wall thickness, which also causes the eddy current EC to be minimal or non-existent where the webs 46 are located. Also, the splines 42 and 50 of the gear 30 are situated to be closer to the inductor coil 22 when compared to the webs 46 of the gear 30. Thus, only the splines 42 and 50 are heat treated, as a minimal amount or no eddy current EC is created in an area of the gear 30 that does not include a spline. Therefore, only the splines 42 and not the webs 46 of the gear 30 are heat treated. It is beneficial to only induction heat the splines 42, as the webs 46 have a reduced wall thickness and are susceptible to melting or cracking during heat treatment.

The quenching plate 24 is used to position and secure the inductor coil 22 in place within the work station 10, where a portion 58 of the inductor coil 22 is located within the quenching plate 24. The quenching plate 24 includes a plurality of fluid passageways 60 that are in fluid communication with a fluid source (not shown). The fluid can be any kind of quenching fluid used to quench metallic materials such as, for example, quenching oil or a water based polymer. The fluid passageways 60 are used to communicate fluid from the fluid source to the inner surface 32 of the gear 30. Specifically, after the splines 42 have been heated by the inductor coil 22, the inner surface 32 of the gear is quenched. Quenching produces a desired depth of hardening, or case, along the inner surface 32 the gear 30. Specifically, quenching the gear 30 will produce case hardening to a predetermined heat treatment depth, thereby case hardening only the splines 42 and not the webs 46 located along the inner surface 32 of the gear 30.

The quenching plate 24 can also include a flux intensifier formed therein. The flux intensifier is employed to provide selective heating to the splines 42 of the gear 30, improves the electrical efficiency of the inductor coil 22, and can also act as an electromagnetic shield to prevent the undesirable heating of the webs 46. The flux intensifier may be constructed from a high permeability, low power loss material such as, for example, a molded material including iron powders in a non-conductive binder.

The work station 10 is a rotatable type induction hardening device. Utilizing a rotatable type induction hardening device generally eliminates the need to use an induction hardening technique where the gear 30 is oriented in a particular position within the work station 10. Requiring the gear 30 to be oriented in the induction hardening machine may cause problems if the gear 30 is loaded into the induction hardening machine by a robotic device. Moreover, employing a rotatable type induction hardening device also reduces the instances of melting or cracking at the webs 46, can increase the gear's 30 dimensional tolerances, and results in simpler and less expensive tooling. In one embodiment, the gear 30 achieves improved hardness at the splines 42 such that the gear 30 can potentially replace a more costly powder metal part in a transmission.

With continued reference to FIGS. 1A-1C, a method of hardening a gear 30 using the working station 10 is generally described. The method begins by providing a gear 30 having the inner surface 32, the outer surface 34, the splines 42, and the webs 46. The inner surface 32 of the gear 30 includes a plurality of splines 42 that cover a portion of the circumference of the inner surface 32, where the splines 42 are arranged in a series of spline groups 44. The webs 46 represent an area of reduced wall thickness and strength along the inner surface 32. The spline groups 44 have a first wall thickness W1 and the webs 46 have a second wall thickness W2, where the first wall thickness W1 is greater than the second wall thickness W2. Because of this, it is typically desirable to heat treat only the splines 42, as the webs 46 have a reduced wall thickness and are therefore susceptible to melting or cracking. The method then proceeds to a second step.

In second step, the gear 30 is positioned within the work station 10 such that the inductor coil 22 is surrounded by the inner surface 32 of the gear 30. The work station 10 is a rotatable type induction hardening device, which means that the inductor coil 22 heats the splines 42 while rotating the gear 30. The method may then proceed to a third step.

In the third step, the gear 30 is rotated by the rotational mechanism 28 about the axis A-A relative to the inductor coil 22. In one exemplary embodiment, the gear 30 is rotated at about 1000 revolutions per minute, however it is understood that other rotational speeds may be used as well. Alternatively, the gear 30 may be oscillated relative to the inductor coil 22 as well. The method may then proceed to a fourth step.

In the fourth step, the inductor coil 22 is energized by the power supply 20 to heat the splines 42 of the gear 30. The inductor coil 22 is energized for the predetermined frequency and power level for a predetermined amount of time to achieve a desired level of heating. The frequency, power level, and time are interrelated and depend on the particular application and configuration of the gear 30. Specifically, the inductor coil 22 produces an alternating magnetic field B that generates eddy currents within the gear 30 for induction hardening. Referring to FIG. 1A an eddy current EC (FIGS. 1B-1C) generated within the gear 30 induction heat treats only the splines 42 and 50. Specifically, the heating loop 54 of the inductor coil 22 creates the eddy current EC that induction hardens the inner surface 32 of the gear 30 only along the splines 42 and 51. Thus, the splines 42 but not the webs 46 of the gear 30 receive the majority or greater amount of the eddy current EC flowing within the domain of the spline which is heated by the inductor coil 22. The method may then proceed to a fifth step.

In the fifth step, the inductor coil 22 is maintained at the predetermined frequency for a predetermined amount of time by supplying power to the power source 20. The method may then proceed to a sixth step.

In the sixth step, the gear 30 is quenched by fluid communicated by a plurality of fluid passageways 60 located in the quenching plate 24. Quenching produces case hardening at a predetermined heat treatment depth, thereby case hardening only the splines 42 and not the webs 46 located along the inner surface 32 of the gear 30. The method may then terminate.

Induction hardening the splines 42 will produce a hardened outer surface while still keeping the core of the gear 30 unhardened. This results in the gear 30 having hardened surface properties while having a softer, more ductile core that provides toughness as well as enhances mechanical and metallurgical properties. Induction hardening using the rotatable type induction hardening approach reduces tooling costs as well, because the gear 30 does not need to be oriented in a particular position within an induction hardening machine. Finally, induction hardening using the rotatable induction approach will result in more uniform case hardening depths of the inner surface 32 of the gear 30, which results in improved mechanical and metallurgical properties of the gear 30 when compared to the current induction hardening techniques that are currently employed.

The description of the invention is merely exemplary in nature and variations that do not depart from the gist of the invention are intended to be within the scope of the invention. Such variations are not to be regarded as a departure from the spirit and scope of the invention.

What is claimed is:

1. A method of induction heat treating a first portion of a gear, wherein a second portion of the gear remains untreated by induction heating, wherein the gear has an inner surface, wherein the first portion and the second portion are located along the inner surface of the gear, and wherein the first portion has a first width and the second portion has a second width, the method comprising:

placing the gear within a workstation, wherein the workstation has a power source and an inductor coil, and wherein the inner surface of the gear is positioned to be proximate to the inductor coil, wherein the power source provides alternating current to the inductor coil, and wherein the inductor coil includes at least one heating loop and at least one non-heating loop, where the heating loop has a heating loop width and the non-heating loop has a non-heating loop width, and wherein the non-heating loop width is configured to be about equal to the second width of the second portion of the gear, and wherein the heating loop width is configured to be about equal to the first width of the first portion of the gear;

rotating the gear about an axis of rotation, wherein the gear is rotated relative to the inductor coil;

energizing the inductor coil to a predetermined frequency to create an alternating magnetic field, wherein the magnetic field developed in the heating loop induces an eddy current in the first portion of the gear; and maintaining the inductor coil at the predetermined frequency for a predetermined amount of time to induction harden the gear at the first portion.

2. The method of claim 1 comprising the step of providing a plurality of spline groups as the first portion of the gear and a plurality of webs as the second portion of the gear.

3. The method of claim 1 comprising the step of quenching the gear by fluid, wherein fluid is supplied to the gear by a quenching plate having a series of fluid passageways.

4. The method of claim 3 comprising the step of providing a flux intensifier that is included within the quenching plate.

5. The method of claim 3 comprising the step of positioning the inductor coil in place within the workstation by the quenching plate, wherein a portion of the inductor coil is located within the quenching plate.

6. The method of claim 1 comprising the step of rotating the gear about the axis at a rotary speed of about 1000 RPM.

7. The method of claim 1 comprising the step of orienting the eddy current to extend lengthwise along the first portion of the gear.

8. The method of claim 1 comprising the step of orienting the eddy current to extend circumferentially around the inner surface of the gear.

9. The method of claim 1 comprising the step of providing a portion of the non-heating loop that is parallel with the axis of rotation of the gear.

10. The method of claim 9 comprising the step of creating a net alternating magnetic field that is about zero in the portion of the non-heating loop that is parallel with the axis of rotation.

11. A method of induction heat treating a gear, wherein the gear includes an inner surface, a plurality of splines and a plurality of webs, wherein the plurality of splines and the plurality of webs are located along the inner surface, and wherein the plurality of splines are induction heat treated and the plurality of webs remain untreated by induction heating, and wherein each of the plurality of spline groups have a first width and each of the plurality of webs have a second width, the method comprising:

placing the gear within a workstation, wherein the workstation has a power source and an inductor coil, and wherein the inner surface of the gear is positioned to be proximate to the inductor coil, wherein the power source provides alternating current to the inductor coil, and wherein the inductor coil includes at least one heating loop and at least one non-heating loop, where the heating loop has a heating loop width and the non-heating loop has a non-heating loop width, and wherein the non-heating loop width is configured to be about equal to the second width of the gear, and wherein the heating loop width is configured to be about equal to the first width of the gear;

rotating the gear about an axis of rotation, wherein the gear is rotated relative to the inductor coil;

energizing the inductor coil to a predetermined frequency to create an alternating magnetic field, wherein the magnetic field developed in the heating loop induces an eddy current in the plurality of splines of the gear, and wherein a net alternating current that is about zero is created in a portion of the non-heating loop; and maintaining the inductor coil at the predetermined frequency for a predetermined amount of time to induction harden the gear at the plurality of splines; and quenching the gear by fluid, wherein fluid is supplied to the gear by a quenching plate having a series of fluid passageways, and wherein a flux intensifier is included within the quenching plate, and wherein the inductor coil is positioned within the workstation by the quenching plate and a portion of the inductor coil is located within the quenching plate.

* * * * *